(12) United States Patent
Crawford et al.

(10) Patent No.: US 7,417,991 B1
(45) Date of Patent: Aug. 26, 2008

(54) NETWORK QUALITY ESTIMATION

(75) Inventors: James Crawford, Willoughby (AU);
Neil Hepworth, Artarmon (AU); Bhum Chul Kim, Sydney (AU); Muneyb Minhazuddin, Quakers Hill (AU); Alexander Scholte, Chatswood (AU)

(73) Assignee: Avaya Inc., Basking Ridge, NJ (US)

( * ) Notice: Subject to any disclaimer, the term of this patent is extended or adjusted under 35 U.S.C. 154(b) by 892 days.

(21) Appl. No.: 10/741,263

(22) Filed: Dec. 18, 2003

(51) Int. Cl.
*H04L 12/28* (2006.01)
*H04L 12/56* (2006.01)

(52) U.S. Cl. .............. 370/394; 370/351; 370/352; 370/353; 370/354; 370/356; 370/465; 370/467; 370/252; 370/253; 370/231; 370/232; 709/224; 709/231; 709/232; 709/233; 709/203

(58) Field of Classification Search .............. None
See application file for complete search history.

(56) References Cited

U.S. PATENT DOCUMENTS

| 6,430,620 B1 * | 8/2002 | Omura et al. ............. 709/231 |
| 2003/0145077 A1 * | 7/2003 | Khan et al. ............. 709/224 |

OTHER PUBLICATIONS

"Packet Reordering Metric for IPPM," Network Working Group—Internet Draft, Morton, et al. (Mar. 2003).
"RTP Control Protocol Extended Reports (RTCP XR)," Audio/Video Transport Working Group—Internet Draft, Friedman, et al. (Apr. 2003).
"RTP: A Transport Protocol for Real-Time Applications," Network Working Group, Schulzrinne, et al. (Jul. 2003).

* cited by examiner

*Primary Examiner*—Raj K Jain
(74) *Attorney, Agent, or Firm*—David Volejnicek

(57) ABSTRACT

Disclosed are new calculations of packet loss bursts, packet re-ordering, and an indication of relative alternate network path delay metrics, based upon differences between received and expected packet sequence numbers, for determining packet network performance.

12 Claims, 4 Drawing Sheets

NETWORK QUALITY ESTIMATION

TECHNICAL FIELD

This invention relates to measuring and estimating the quality-of-service (QoS) provided by a packet transmission network.

BACKGROUND OF THE INVENTION

Certain transmissions, particularly real-time audio transmissions such as Voice over Internet Protocol (VoIP), are sensitive to the quality of the network connection over which they are being transmitted. Packet loss has greatest effect on voice quality. Packet loss may occur due to buffer overflow within the network, due to packets being deliberately discarded as a result of some congestion control scheme (e.g., Random Early Detection), or due to transmission errors. Several of the mechanisms that can lead to packet loss are of a transient nature, and hence the resulting packet loss is bursty in nature. A Markovian loss model suitably represents the distribution of packet loss in the Internet.

Jitter (or packet-delay variation) also has an effect on voice quality. However, the use of a jitter buffer compensates for jitter by increasing delay. Incoming packets are buffered and then read out at a constant rate; if packets are excessively late in arriving, then they are discarded. Jitter buffers are often adaptive and adjust their depth dynamically based on either the current packet-discard rate or current estimated jitter level.

R. Cox, and R. Perkins, *Results of a Subjective Listening Test for G.711 with Frame Erasure Concealment, Committee contribution TIA1.7/99-016*, compared the impact of random and bursty packet loss on G.711 and G.729A codecs. They found that for low packet-loss rates, a bursty distribution gave a higher subjective quality than a non-bursty distribution, whereas for high packet-loss rates, the converse was true. Bursty packet loss is far more detrimental to voice quality than random or evenly-distributed packet loss because packet-loss concealment algorithms are not capable of masking bursty packet loss.

Network engineers and administrators need to know how the network is performing and need to make adjustments that affect the quality of transmissions over the network. Endpoint terminals likewise need to know how the network is performing so that they can make adjustments that affect the transmission quality, such as the choice of a codec that is used to encode the transmission. Metrics that help the administrators and the endpoint terminals to determine the network quality and performance include packet loss rates and packet re-ordering rates. Most VoIP systems report packet loss. For example, the definition of the Real-time Transport Protocol (RTP) and its companion RTP Control Protocol (RTCP), which is the protocol that is used by most VoIP systems, defines a packet-loss percentage in a reporting period and a cumulative-loss metric. (See, Internet Engineering Task Force (IETF) Network Working Group Request for Comments: 3550, "RTP: A Transport Protocol for Real-Time Applications" (July 2003)).

Although these metrics give an indication of packet loss, they do not provide enough information because they do not describe the characteristics of the loss, such as its distribution. For example, there is no indication as to whether the loss is bursty (i.e., several contiguous packets are lost), evenly spaced (e.g., every xth packet is dropped), or random. These characteristics are important for determining the quality of VoIP transport systems; for example, bursty packet losses are far more detrimental to voice quality than either random or evenly-distributed packet losses. This is because packet-loss-concealment algorithms are not good at masking bursty packet losses. Also, these RTP metrics provide no information for re-ordered packets and their distribution.

Compared to network characteristics such as loss or delay, the dynamics of packet reordering are far less-well understood. A significant part of the problem is the lack of standard experimental techniques for measuring the phenomena. Previous reordering studies have used measurement tools that are inherently biased, such as ping, or methodologies that scale poorly, such as analyzing multi-site packet traces. The lack of a standard measurement methodology also has hampered the creation of a standard reordering metric. Consequently, the results between different studies can superficially vary by an order of magnitude, thereby creating significant confusion and controversy about the prevalence of reordering.

One of the techniques for measuring packet reordering is to generate estimates by sending repeated ICMP echo-request packets to a remote host and then evaluating the order of the ICMP echo-reply packets that are generated in response. The benefit of this approach is that it allows paths to arbitrary hosts to be measured, so long as the end host will respond to ICMP requests. The most obvious limitations of this approach arise from the use of the ICMP echo request/reply protocol for measurement. Using this method, it is not possible to distinguish if a packet was reordered before it arrived at the remote host or after it left the remote host. Consequently, the measurements produced can both underestimate the total reordering and overestimate the re-ordering in either direction. Since most protocols are more sensitive to reordering in one direction than another, this ambiguity can be quite important. Also, the use of ICMP as a fine-grained measurement tool is problematic since system and network operators alike increasingly filter and rate-limit such traffic to address security concerns.

Although packet re-ordering metrics have been proposed for inclusion in Internet Protocol Performance Metrics (IPPM) (see, IETF Network Working Group "Packet Reordering Metric for IPPM" (March 2002)), very few VoIP systems presently log or report any information on packet re-ordering. This is principally because such reports require logging and maintaining of large amounts of historical data, which is a problem for low-cost devices, such as VoIP phones. It is also a burden for devices that seek to maximize channel density with the least amount of hardware, and for devices that have limited processing power and data memory to process such large amounts of historical data.

SUMMARY OF THE INVENTION

This invention is directed to solving these and other problems and disadvantages of the prior art. According to the invention, a method of determining performance of a packet network comprises receiving packets having packet sequence numbers on a communications connection through the network, determining for the communications connection the Sequence Jump Instances (SJI), which is the number of times that a received packet sequence number was greater than an expected packet sequence number, determining for the connection the Maximum Sequence Jump (MSJ), which is the largest difference between the greater received packet sequence number and the expected packet sequence number, determining for the connection a Cumulative Sequence Jump (CSJ), which is the number of determined SJIs, determining for the connection, the Sequence Fall Instances (SFI), which is the number of times that the received packet sequence number was lesser than the expected packet sequence number, determining for the connection the Maximum Sequence Fall (MSF), which is the largest difference between the lesser received packet sequence number and the expected packet sequence number, and indicating performance of the network as a function of the determinations.

Also according to the invention, an apparatus for determining performance of a packet network comprises a receiver for connecting to a communications connection through the network to receive packets having packet sequence numbers, a source of expected packet sequence numbers, a comparator of received packet sequence numbers with expected packet sequence numbers to determine for the connection a number of times that a sequence jump (packet loss or re-ordering) was detected as a number (SJI) of times that a received packet sequence number was greater than an expected packet sequence number, to determine for the connection a largest burst of lost or re-ordered packets as a largest difference (MSJ) between the greater received packet sequence number and the expected packet sequence number, to determine for the connection a cumulative sum (CSJ) of determined SJIs, to determine for the connection a number of times that packets were re-ordered as a number (SFI) of times that the received packet sequence number was lesser than the expected packet sequence number, and to determine for the connection a maximum difference in the delay of alternative paths for the connection through the network as a largest difference (MSF) between the lesser received packet sequence number and the expected packet sequence number, and an indicator of performance of the network as a function of the determinations.

Preferably, a number of packets re-ordered on the connection is determined as a difference between the SFI at a beginning of an interval of time and the SFI at an end of the interval, and a number of packets lost on the connection is determined as a difference between (a) a difference between the CSJ at the beginning of the interval and the CSJ at the end of the interval and (b) the number of packets re-ordered during the interval. The invention provides information regarding packet loss, distribution of packet loss, packet re-ordering, and distribution of packet re-ordering, without requiring storage of a large amount of historical data regarding the packet stream. This makes the technique suited for use in embedded, low-cost, and high-channel-density VoIP devices. In addition to RTP, the invention is equally applicable to any packet protocol that uses packet sequence numbers or other mechanism that allows detection of missing packets in a packet stream.

Where the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from the following description of an illustrative embodiment of the invention considered together with the drawing, in which.

DETAILED DESCRIPTION

Figure 1:
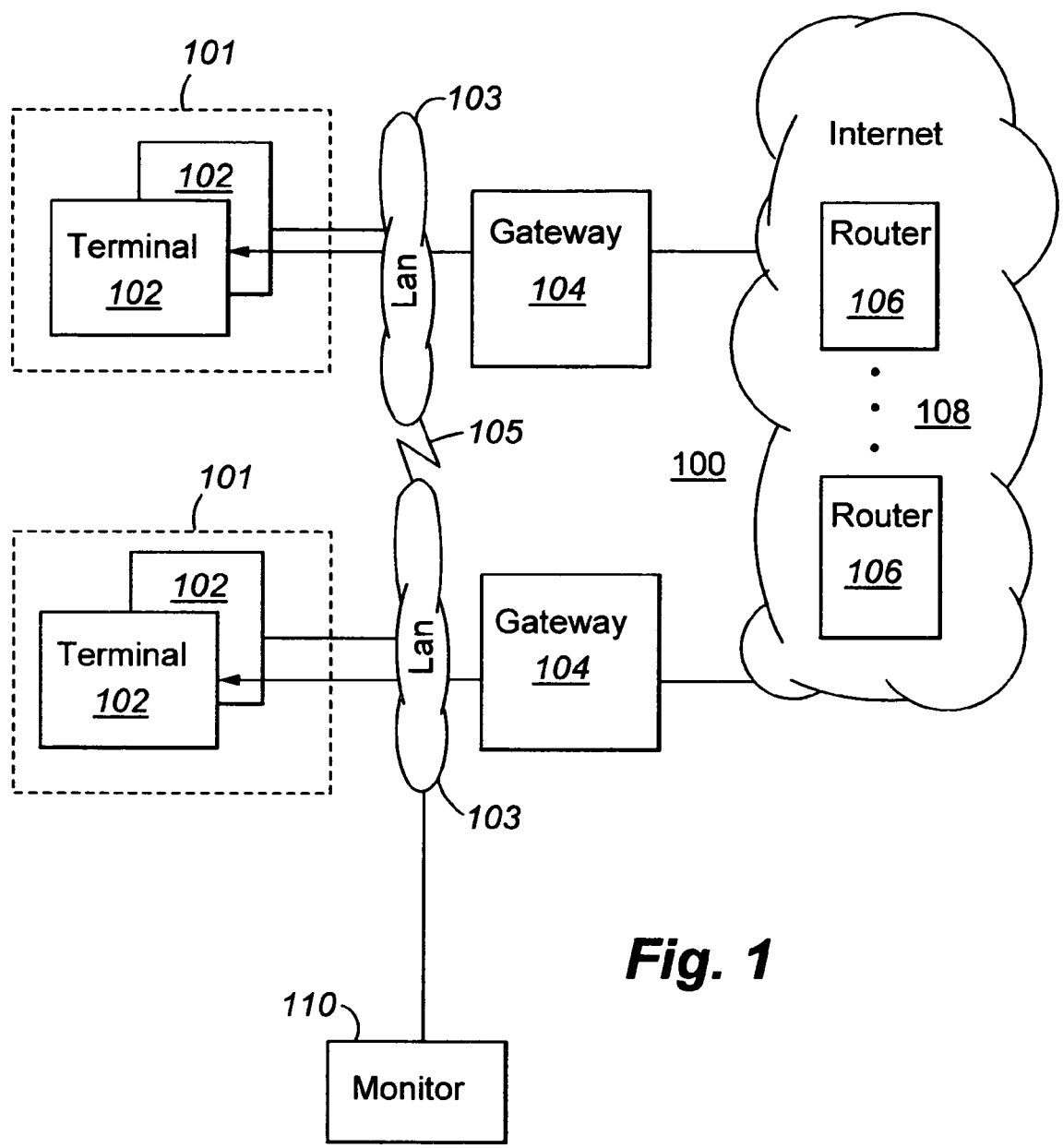
FIG. 1 is a block diagram of a packet transmission network that includes an illustrative embodiment of the invention.

FIG. 1 shows a block diagram of a generalized packet transmission network 100. Packet transmission network 100 comprises a plurality of sets 101 of packet terminals 102 (for example, VoIP telephones). The terminals 102 of each set are interconnected with each other by a local area network (LAN) 103 and are connected by packet gateways 104 to a network of packet routers 106, such as internet 108. Additionally, LANS 103 may be directly interconnected by a wide area network (WAN) 105. One or more network-quality monitors 110 may be connected to one or more LANS 110. All elements 102, 104, 106, and 110 usually are stored-program-controlled devices that include storage for storing programs and data and processors for executing the stored programs and using the data, as well as hardware for performing their physical signal transmission, reception, and routing functions. The present invention is typically implemented in program form (as software) although it may be implemented in any desirable form, including in hardware or firmware. The invention is typically implemented in one or more terminals 102 or gateways 104, or in monitor 110. It can also be implemented in network monitoring systems running on routers.

The invention includes definition and use of packet loss and packet re-ordering metrics that can be easily determined without using large amounts of network-performance historical data. These metrics can be incorporated into existing standards, for example, into RTP Control Protocol Extended Reports (RTCPXR) (see, IETF Audio/Video Transport Working Group, "RTP Control Extended Reports (RTCPXR)" (16 Apr. 2003)). The new metrics are Sequence Jump Instances (SJI), Maximum Sequence Jump (MSJ), Cumulative Sequence Jump (CSJ), Sequence Fall Instances (SFI), and Maximum Sequence Fall (MSF). These metrics are defined as follows:

SJI—the number of times that a packet sequence number was received that was greater than the expected packet sequence number MSJ—the largest difference between the expected packet sequence number and the greatest previously received packet sequence number CSJ—the sum of the sizes of all individual sequence jumps, where a sequence jump is defined as the difference between the received sequence number and the expected sequence number.

SFI—the number of times that a packet sequence number was received that was lesser than the expected packet sequence number MSF—the largest difference between the expected packet sequence number and the lesser received packet sequence number These metrics are obtained on a per-time-interval or a per-connection basis. For example, the metrics are received from all endpoints at regular time intervals (i.e., typically each endpoint sends this data once every 5 seconds). Or, the information is per-connection or per-flow. The information is most useful if updated at regular intervals. Cumulative counts for each metric are used to circumvent packet loss of the reporting packets. [AMS5] The information is per connection or flow. The information is most useful if updated at regular intervals. Cumulative counts for each metric is used to circumvent packet loss of the reporting packets.

The "expected sequence number" results from ordered delivery of packets. This is a property of successful packet transfer attempts, where the packet sequence monotonically changes (usually increases) for each arriving packet and there are no backwards steps (except at roll-over of the maximum count back to the initial count). An explicit sequence number, such as an incrementing message number or the packet sending time, carried in each packet establishes the sequence. Under normal conditions, the value of the "expected sequence number" at any instant is taken to be one more than the sequence number of the previous packet. In byte-stream numbering, the "expected sequence number" is a value one byte greater than the last in-order packet sequence number plus payload. If source time is used as the sequence number, the "expected sequence number" is a time difference relative to the amount of data in the packet (e.g., if each packet contains 30 ms of voice then each time stamp should be plus 30 ms).

The network performance measures are functions of the metrics. For a reporting period (a measuring interval of time $\Delta t$) where t−1 marks the beginning of the period and t marks the end of the period, the network-performance measures are as follows:

the number of lost packets in time $\Delta t = \text{Max}((CSJ_t - CSJ_{t-1}) - (SFI_t - SFI_{t-1}), 0)$ the number of re-ordered packets in time $\Delta t = (SFI_t - SFI_{t-1})$ an indication of the number of times that packet loss or re-ordering was detected=SJI the largest burst of lost or re-ordered packets=MSJ. (This also indicates the largest gap in data that the jitter buffer may have to deal with.)

the total number of times that packets were re-ordered=SFI an indication of the maximum difference in the delay of alternative paths for the connection presented by the network=MSF For example, assume that packets having the following sequence numbers were received in two sequential reporting periods: Reporting period 1: 4320, 4322, 4325, 4326, 4323, 4328 Reporting period 2: 4329, 4324, 4330, 4321, 4331, 4332, 4333

The network performance measures would be:
    Reporting period 1: SJI=3, CSJ=4, MSJ=2, SFI=1, MSF=4
    Packets lost=3
    Packets re-ordered=1
    Reporting period 2: SJI=3, CSJ=4, MSJ=0, SFI=3, MSF=10
    Packets lost=1
    Packets re-ordered=3
    Total number of packets lost=1
    Total number of packets re-ordered=3

Figure 2A:
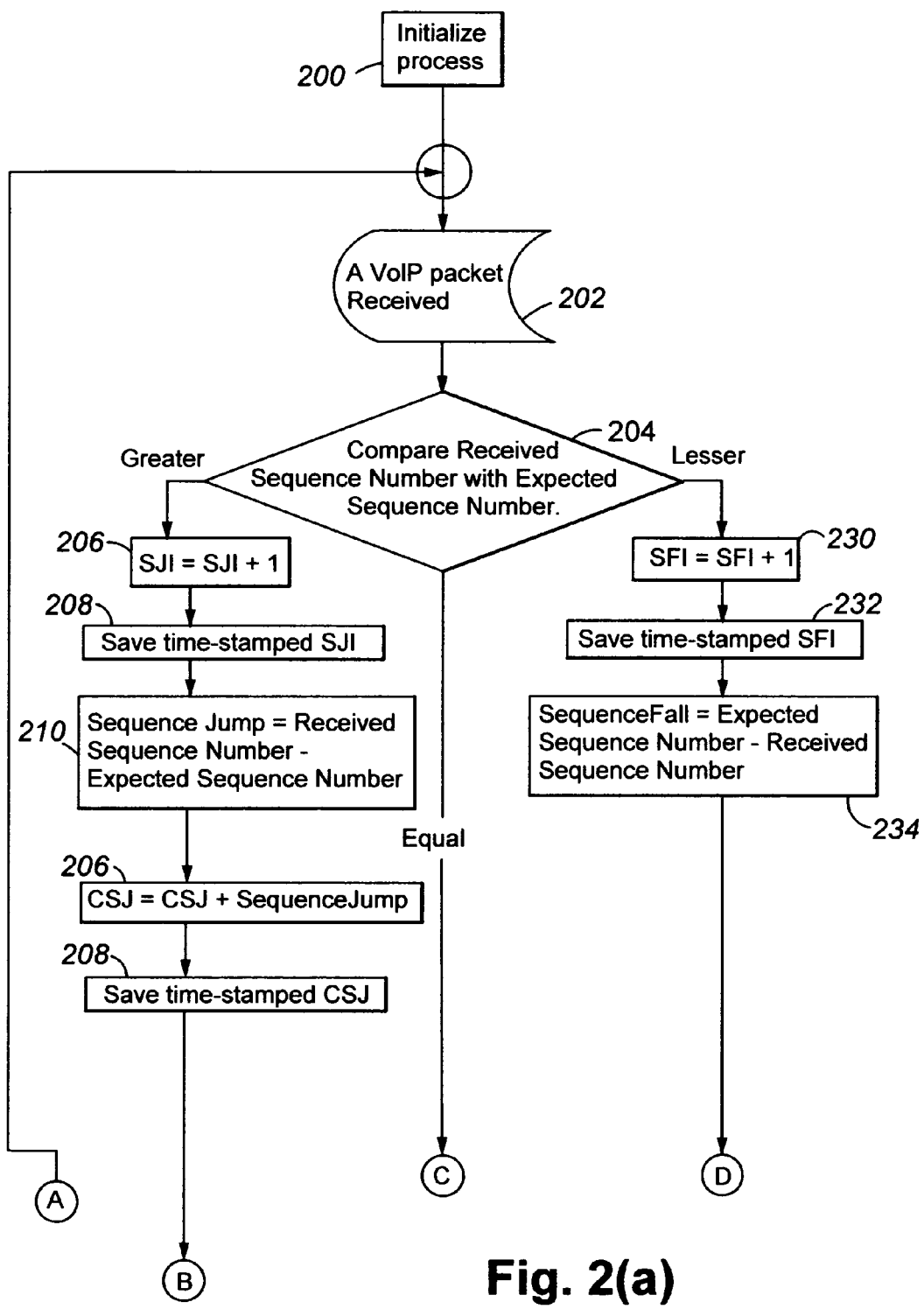
FIGS. 2(a) and 2(b) are a process diagram of a metrics-determining process of an element of the network of FIG. 1.
Figure 2B:
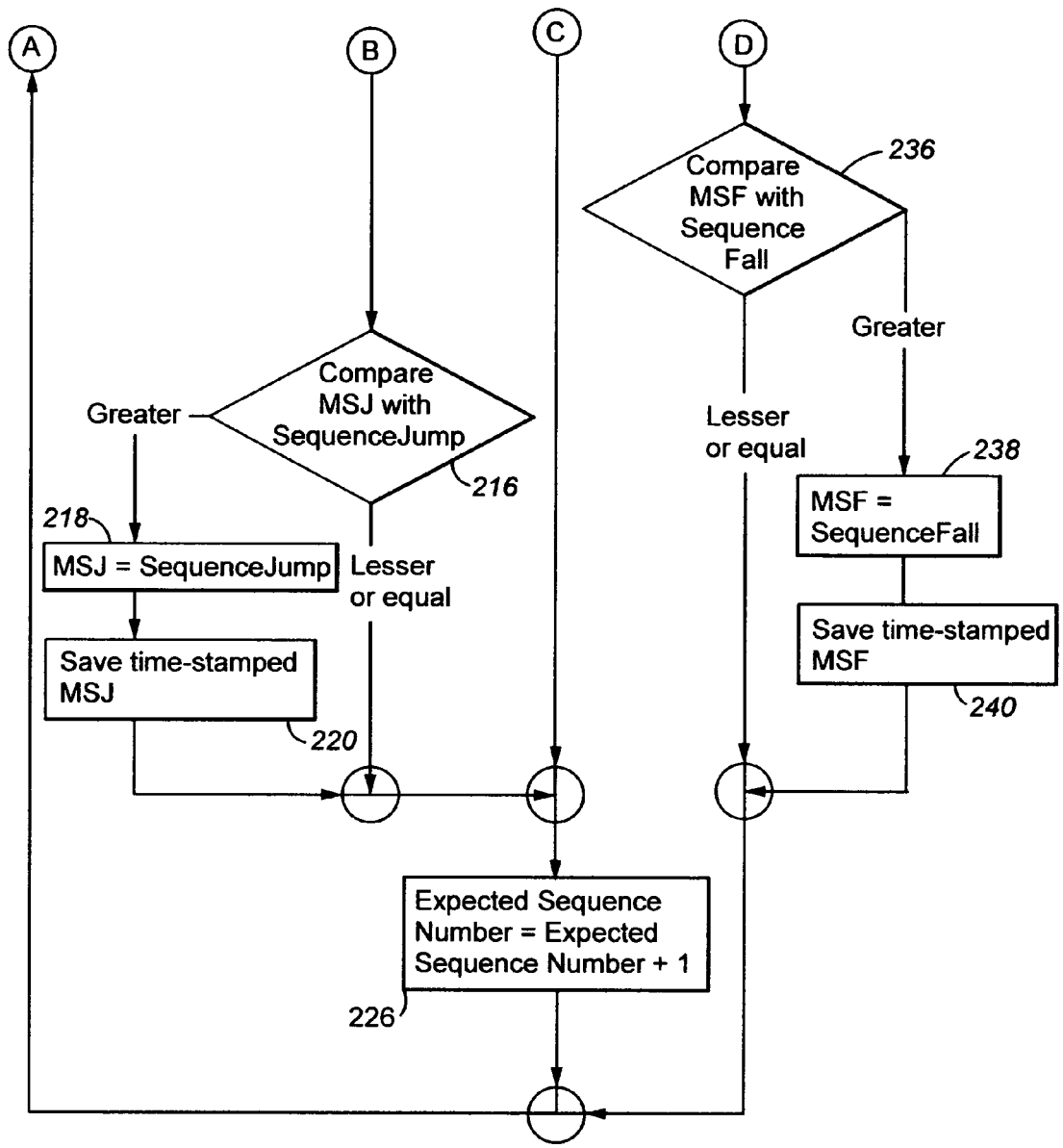

An illustrative process for determining the above-described metrics is diagrammed in FIG. 2. The process is instantiated for each network connection of interest; this could be for every connection in the network. Following initialization of the process, including initialization of its variables such as the Expected Sequence Number which is a source of expected sequence numbers, at step 200, the process awaits receipt of a packet across the corresponding network connection. Upon receipt of a packet, at step 202, the process compares the sequence number of the received packet (the received sequence number) with the expected received number, at step 204. If the received sequence number is greater than the expected sequence number, the process increments the current value of Sequence Jump Instances (SJI) variable by one, at step 206, stores the incremented SJI value with a current time stamp, at step 208, sets the value of a Sequence Jump variable to the difference between the received sequence number and the expected sequence number, at step 210, increments the value of a Cumulative Sequence Jump (CSJ) variable by the value of the Sequence Jump variable, at step 212, and stores the incremented CSJ value with a current time stamp, at step 214. The process then compares the value of a Maximum Sequence Jump (MSJ) variable with the value of Sequence Jump variable, at step 216. If the value of MSJ exceeds the value of the Sequence Jump variable, the process sets the value of the MSJ variable to the value of the Sequence Jump variable, at step 218, stores the new value of the MSJ variable with a current time stamp, at step 220, and then proceeds to step 226. If the value of the MSJ variable does not exceed the value of the Sequence Jump variable at step 216, the process proceeds directly to step 226.

Returning to step 204, if the received sequence number equals the expected sequence number, the process proceeds to step 226. At step 226, the process increments the current value of the expected sequence number by one, and then returns to step 202 to await receipt of the next packet on the network connection.

Returning to step 204, if the received sequence number is smaller than the expected sequence number, the process increments the current value of a Sequence Fall Instance (SFI) variable by one, at step 230, stores the incremented SFI value with a current time stamp, at step 232, and sets the value of a Sequence Fall variable to the difference between the expected sequence number and the received sequence number, at step 234. The process then compares the value of a Maximum Sequence Fall (MSF) variable with the value of the Sequence Fall variable, at step 236. If the value of MSF exceeds the value of the Sequence Fall variable, the process sets the value of the MSF variable to the value of the Sequence Fall variable, at step 238, stores the new value of the MSF variable with a current time stamp, at step 240, and then returns to step 202. If the value of the MSF variable does not exceed the value of the Sequence Fall variable at step 236, the process directly returns to step 202.

Figure 3:
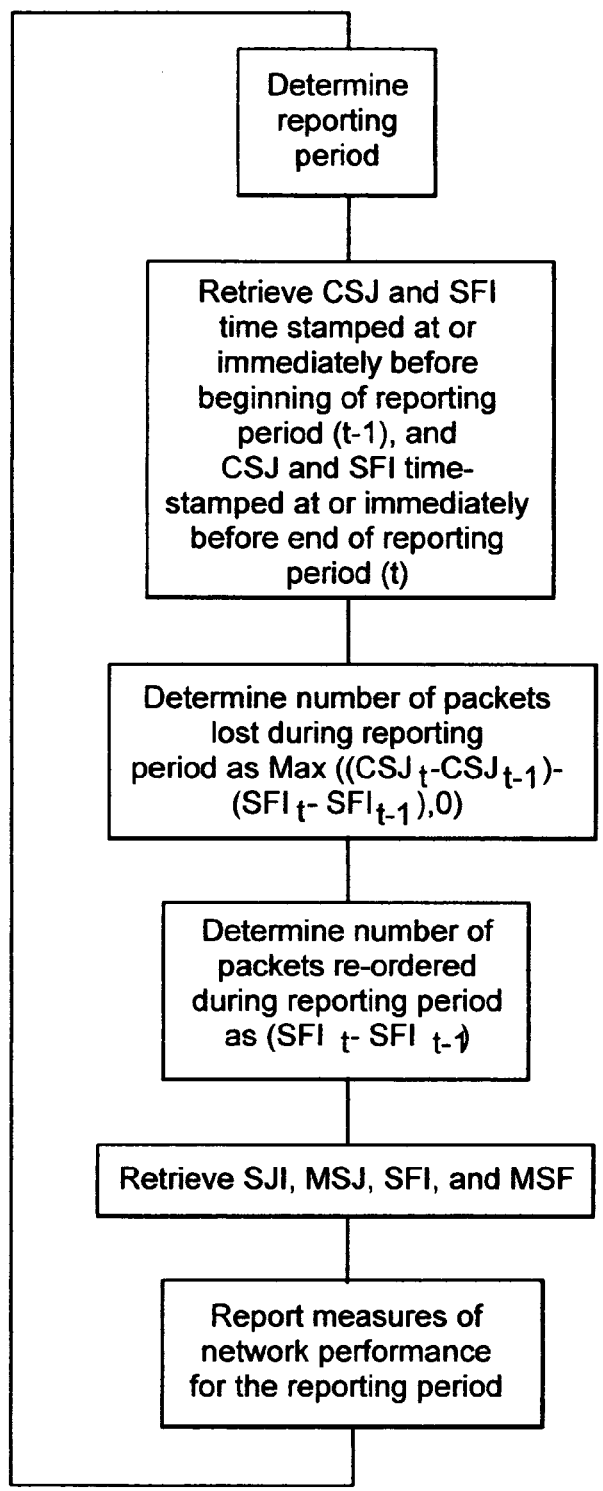
FIG. 3 is a process diagram of a process for determining network performance measures from the metrics determined by the process of FIGS. 2(a) and 2(b).

An illustrative process for determining the network performance measures as a function of the metrics is diagrammed in FIG. 3. First, the reporting period is determined, at step 300. The reporting period may be any arbitrary period of time during the existence of the connection through the network. The reporting period may be each successive period of time of predetermined length or, in the case of RTCP, regular randomised intervals. Once the reporting period is determined, the process retrieves the CSJs and SFIs that were stored by the process of FIG. 2 and reported or time-stamped at or immediately before the beginning of the reporting period and at or immediately before the end of the reporting period, at step 302. These retrieved values are then used to determine the number of packets that were lost during the reporting period, at step 304, and the number of packets that were re-ordered during the reporting period, at step 306. The process then retrieves the SJI, MSJ, SFI, and MSF that were determined and stored by the process of FIG. 2, at step 208. The process reports the measures of network performance for the reporting period, at step 310, and then returns to step 300.

Once they are determined, the reported measures may be displayed to system administrators on monitor 110, and/or to terminal users on terminals 102. These measures can be used to perform VoIP call-quality analysis on a VoIP network, and this information can help to determine and to fix the type of problem being experienced. For example, if there is a lot of packet re-ordering, this implies that there are multiple redundant routes in the network or other problems with the configuration of the network, and the network administrator could re-configure the network to try to always send the VoIP traffic over one route. Or, if the packet-loss statistics indicate bursty loss, then routers can be reconfigured to try to smooth out this loss (e.g., use random early-drop type of algorithms). Any other desired action may be taken as well.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of determining performance of a packet network, comprising: receiving packets having packet sequence numbers on a communications connection through the network; determining for the communications connection a number of times that packet loss or packet re-ordering was detected as a number illustratively referred to as a Sequence Jump Instance (SJI) of times that a received packet sequence number was greater than an expected packet sequence number; determining for the connection a largest burst of lost or re-ordered packets as a largest difference illustratively referred to as a Maximum Sequence Jump (MSJ) between the greater received packet sequence number and the expected packet sequence number; determining for the connection a cumulative sum illustratively referred to as a Cumulative Sequence Jump (CSJ) of determined SJIs; determining for the connection a number of times that packets were re-ordered as a number illustratively referred to as a Sequence Fall Instance (SFI) of times that the received packet sequence number was lesser than the expected packet sequence number; determining for the connection a maximum difference in delay of alternative paths for the connection through the network as a largest difference illustratively referred to as a Maximum Sequence Fall (MSF) between the lesser received packet sequence number and the expected packet sequence number; and indicating performance of the network as a function of the determinations.

2. The method of claim 1 wherein:
indicating comprises
using the determinations to modify the performance of the network.

3. The method of claim 1 further comprising:
determining a number of packets re-ordered on the connection as a difference between the SFI at a beginning of an interval of time and the SFI at an end of the interval; and
determining a number of packets lost on the connection as a difference between (a) a difference between the CSJ at the beginning of the interval and the CSJ at the end of the interval and (b) the number of packets re-ordered during the interval.

4. The method of claim 3 wherein:
the interval of time comprises duration of existence of the connection.

5. The method of claim 3 wherein:
the interval of time comprises a predetermined time interval of existence of the connection.

6. An apparatus for performing the method of one of claims 1-5.

7. A computer readable medium encoded with executable instructions to perform the method of one of claims 1-5.

8. An apparatus for determining performance of a packet network, comprising: a receiver for connecting to a communications connection through the network to receive packets having packet sequence numbers; a source of expected packet sequence numbers; a comparator of received packet sequence numbers with expected packet sequence numbers to determine for the connection a number of times that packet loss or packet re-ordering was detected as a number illustratively referred to as a Sequence Jump Instance (SJI) of times that a received packet sequence number was greater than an expected packet sequence number, to determine for the connection a largest burst of lost or re-ordered packets as a largest difference illustratively referred to as a Maximum Sequence Jump (MSJ) between the greater received packet sequence number and the expected packet sequence number, to determine for the connection a cumulative sum illustratively referred to as a Cumulative Sequence Jump (CSJ) of determined SJIs, to determine for the connection a number of times that packets were re-ordered as a number illustratively referred to as a Sequence Fall Instance (SFI) of times that the received packet sequence number was lesser than the expected packet sequence number, and to determine for the connection a maximum difference in delay of alternative paths for the connection through the network as a largest difference illustratively referred to as a Maximum Sequence Fall (MSF) between the lesser received packet sequence number and the expected packet sequence number; and an indicator of performance of the network as a function of the determinations.

9. The apparatus of claim 8 wherein:
the indicator is for use in modifying performance of the network.

10. The apparatus of claim 8 further comprising:
a means for determining a number of packets re-ordered on the connection as a difference between the SFI at a beginning of an interval of time and the SFI at an end of the interval, and for determining a number of packets lost on the connection as a difference between (a) a difference between the CSJ at the beginning of the interval and the CSJ at the end of the interval and (b) the number of packets re-ordered during the interval.

11. The apparatus of claim 10 wherein:
the interval of time comprises duration of existence of the connection.

12. The apparatus of claim 10 wherein:
the interval of time comprises a predetermined time interval of existence of the connection.

* * * * *